(12) United States Patent
van Driel

(10) Patent No.: US 7,356,762 B2
(45) Date of Patent: Apr. 8, 2008

(54) METHOD FOR THE AUTOMATIC GENERATION OF AN INTERACTIVE ELECTRONIC EQUIPMENT DOCUMENTATION PACKAGE

(75) Inventor: Marinus A. van Driel, IJsselstein (NL)

(73) Assignee: ASM International NV, Bilthoven (NL)

( * ) Notice: Subject to any disclaimer, the term of this patent is extended or adjusted under 35 U.S.C. 154(b) by 519 days.

(21) Appl. No.: 10/191,635

(22) Filed: Jul. 8, 2002

(65) Prior Publication Data

US 2004/0004636 A1  Jan. 8, 2004

(51) Int. Cl.
*G06F 15/00* (2006.01)
*G06F 17/00* (2006.01)

(52) U.S. Cl. .................. 715/500; 715/853; 715/760

(58) Field of Classification Search ............. 715/500, 715/502, 505, 510, 513, 514, 517, 526, 854, 715/501.1, 531, 760, 744, 853, 864; 717/513; 707/3, 523

See application file for complete search history.

(56) References Cited

U.S. PATENT DOCUMENTS

| | | | | |
|---|---|---|---|---|
| 5,708,825 | A * | 1/1998 | Sotomayor | 715/501.1 |
| 5,761,328 | A * | 6/1998 | Solberg et al. | 382/113 |
| 5,819,092 | A * | 10/1998 | Ferguson et al. | 717/113 |
| 5,982,931 | A * | 11/1999 | Ishimaru | 382/218 |
| 5,987,480 | A * | 11/1999 | Donohue et al. | 715/501.1 |
| 6,014,677 | A * | 1/2000 | Hayashi et al. | 707/104.1 |
| 6,104,401 | A * | 8/2000 | Parsons | 715/804 |
| 6,496,819 | B1 * | 12/2002 | Bello et al. | 707/3 |
| 6,507,410 | B1 * | 1/2003 | Robertson et al. | 358/1.18 |
| 6,574,644 | B2 * | 6/2003 | Hsu et al. | 715/501.1 |
| 6,886,134 | B1 | 4/2005 | Cason | |
| 6,963,930 | B2 | 11/2005 | Halpert et al. | |
| 7,010,580 | B1 * | 3/2006 | Fu et al. | 709/217 |
| 7,111,232 | B1 * | 9/2006 | Bascom | 715/513 |
| 2002/0013792 | A1 * | 1/2002 | Imielinski et al. | 707/523 |
| 2002/0069222 | A1 * | 6/2002 | McNeely | 707/513 |
| 2002/0077921 | A1 | 6/2002 | Morrison et al. | |
| 2002/0112114 | A1 * | 8/2002 | Blair et al. | 711/100 |

(Continued)

FOREIGN PATENT DOCUMENTS

EP  1 260 918 A2  11/2002

(Continued)

OTHER PUBLICATIONS

"EditPad Pro Mighty Fine Text Editor," [on line], [retrieved May 1, 2007]. Retrieved from the Internet <http://web.archive.org/web/20011204164849/www.editpadpro.com/index.html>, pp. 1-4.

(Continued)

*Primary Examiner*—Tadesse Hailu
(74) *Attorney, Agent, or Firm*—Allen J. Moss, Esq.; Squire Sanders & Dempsey LLP

(57) ABSTRACT

An interactive electronic equipment document production system is disclosed. Documents from different sources are standardized in a conversion process, provided with tags in a tagging process that provides information connecting an initial locating with another location and are evaluated in a building process where tags and tag information are evaluated. Though the use of associated files, CAD files and generic pictures can be provided with tags and links without modifying the actual CAD file or generic picture.

40 Claims, 13 Drawing Sheets

U.S. PATENT DOCUMENTS

| | | | |
|---|---|---|---|
| 2002/0152244 A1* | 10/2002 | Dean et al. | 707/530 |
| 2002/0184111 A1* | 12/2002 | Swanson | 705/26 |
| 2003/0035002 A1* | 2/2003 | Moles | 345/760 |
| 2003/0065413 A1* | 4/2003 | Liteplo et al. | 700/96 |
| 2004/0001106 A1 | 1/2004 | Deutscher et al. | |
| 2004/0004636 A1 | 1/2004 | van Driel | |
| 2004/0010772 A1* | 1/2004 | McKenna et al. | 717/101 |
| 2004/0014013 A1 | 1/2004 | Diesel et al. | |
| 2004/0143569 A1 | 7/2004 | Gross et al. | |
| 2005/0015726 A1 | 1/2005 | Tuominen | |
| 2006/0080292 A1 | 4/2006 | Alanzi | |
| 2006/0095835 A1 | 5/2006 | Kennedy et al. | |
| 2006/0230058 A1 | 10/2006 | Morris | |

FOREIGN PATENT DOCUMENTS

| | | |
|---|---|---|
| JP | 10-111873 | 4/1998 |
| JP | 10-334082 | 12/1998 |
| JP | 2001-051893 | 2/2001 |
| JP | 2001-209495 | 8/2001 |
| JP | 2003-122619 | 4/2003 |
| JP | 2003-177954 | 6/2003 |
| JP | 2004-348418 | 12/2004 |
| WO | WO 98/43150 | 10/1998 |
| WO | WO 02/17162 A2 | 2/2002 |
| WO | WO 03/039101 A2 | 5/2003 |
| WO | WO 2004/107081 A2 | 12/2004 |
| WO | WO 2006/055874 A2 | 5/2006 |

OTHER PUBLICATIONS

"EditPad Pro Screen Shots," [on line], [retrieved on May 1, 2007]. Retrieved from the Internet <http://web.archive.org/web/20011204000542/www.editpadpro.com/editpadproscreen.html>, pp. 1-11.

"NetCaptor," [on line], [retrieved on May 1, 2007]. Retrieved from the Internet <http://web.archive.org/web/20011030011833/netcaptor.com/tour.php>, p. 2 of 2.

"Opera Software," [retrieved on May 1, 2007]. Retrieved from the Internet <http://web.archive.org/web/20010206212116/www.opera.com/windows/>, pp. 1-2.

"Tabbed document interface," [retrieved on May 1, 2007]. Retrieved from the Internet <http://en.wikipedia.org/wiki/Tabbed_document_interface>, pp. 1-7.

"EditPad Pro Mighty Fine Text Editor," [retrieved on May 1, 2007]. Retrieved from the Internet <http://web.archive.org/web/20011204164849/www.editpadpro.com/index.html>, pp. 1-4.

"Opera-the fastest brosser on earth!" [retrieved on May 1, 2007]. <http://web.archive.org/webweb/20010206212116/www.opera.com/windows/>, pp. 1-2.

"Tabbed document interface," [retrieved on May 1, 2007]. Retrieved from the Internet <http://en.wikipedia.org/wiki/Tabbed_document_interface>, pp. 1-7.

"Mark's Web Page," [retrieved on May 1, 2007]. Retrieved from the Internet <http://web.archive.org/web/20010201160200/plaza.v-wave.com/mark/products/araneae.html>, pp. 1-2.

* cited by examiner

METHOD FOR THE AUTOMATIC GENERATION OF AN INTERACTIVE ELECTRONIC EQUIPMENT DOCUMENTATION PACKAGE

FIELD OF THE INVENTION

The invention relates to electronic documentation systems where the documentation is provided with links that allow a user to jump from one piece of information to a related piece of additional information. More in particular, the invention relates to a method for the automated generation of an Interactive Electronic Equipment Documentation (IEED) package for capital equipment.

BACKGROUND OF THE INVENTION

Electronic documentation systems that include hypertext links for navigation purposes are well known. For example, an Internet page is typically provided with hyperlinks for navigation within a page and between other pages. Often, a hyperlink is displayed as a word or group of words that are offset from other words in the document by virtue of a difference in color. Additionally a special icon or picture can be associated with a word of group of words to set as a hyperlink. The ways to display a hyperlink are well known. Clicking on a hyperlink on a web page can jump to a different section on the web page or can open another Internet page. Other types of hyperlinks can be associated with files such as a sound file or a video file. Selecting a hyperlink can open the file allowing for a sound file to be heard or a video file to be viewed.

Therefore, a hyperlink in an Internet page or electronic document written in a mark-up language such as the well-known hypertext markup language (HTML) allows for navigation between and within pages of a document and can open files associated with the link. Commercially available programs like Folio Views sold by Next page of Lehi, Utah provide much more sophisticated capabilities. In such a program, text documents can be provided with different types of hyperlinks, such as jump links, program links, query links, and script links. Jump links allow jumping to a predefined location in the same or in a different document. Query links display those parts of a document that comply with a query selection criteria. A program link can open any kind of document using its associated program. Script links can be used to trigger dedicated modules in a viewer program. To use these types of links, documents have to be prepared beforehand with the relevant link information like jump destinations, the selection criteria, and necessary labels pre-embedded. For an IEED system, the preparation of the documents and the creation of hyperlinks are a labor-intensive process. This is not as large a problem for the embodiment where the documentation is built once and stays the same for many users over a long period of time. However, it becomes very costly to create and maintain a documentation system when a large number of variations are included and material changes frequently.

Unfortunately, the latter is the case in industries such as the semiconductor industry where expensive and complex capital equipment is used for the production of the semiconductor devices. The different pieces of equipment as used by different customers are normally not identical, since they contain either special production related parts particular to specific customers, or have to comply with customer requirements. Therefore, different IEED packages must be created for each customer. Since there is a definitive need for IEED systems, containing all the customer specific variations, it is necessary to use automated techniques to minimize the cost of creation of an IEED package.

SUMMARY OF THE INVENTION

The objective of the present invention is to provide a method for building an IEED system in an automated way. This means to provide in a method for building an on-line documentation system, provided with hyperlinks and queries, collectively called links, that allows dealing with text documents in combination with drawings and other non-text documents and that can be build in a highly automated way. Another object of the invention is the creation of a browser, which allows simultaneous viewing of related information in the IEED system.

According to the invention, the formation of the IEED package proceeds in three phases. First is a phase of providing documents in a known file format. This phase can comprise converting the provided documents, which can come from different sources and have a large number of different formats, into a number of predefined, standardized file formats. The provided documents with known file format or the converted documents with standardized file format are placed in a data storage. Unless the content changes, each input file will only be converted once.

Next is a tagging phase. In this phase the standardized files are provided with tags, which will be used in a later stage to create a hotspot in the document and a hyperlink, activated by the hotspot. The hyperlink refers to a jump link, query link, program link, or a script link. These tags will be created automatically, based on a predefined tagging rule base. Tagging information can be stored either in the standardized file itself, or in a file associated with it. Output of this phase is stored in data storage. Each standardized file will only be tagged once, unless the content changes.

The third phase is the building phase. In this phase all individual IEED packages, each called a project, are created. For a certain project, a building program automatically selects the required pieces of documentation from the data storage with standardized and tagged files, and creates the links between corresponding tags. The selection of required documents and the creation of the links are based on the information provided in the tags, and the instructions in the predefined builder rule base.

Finally, to allow the use of an IEED package, a viewer is created using commercially available Active-X software components. The viewer will handle the display of the documents, which can have different file formats, and all the hyperlinking between these documents, in such a way that there is only one user interface, independent of the file formats being displayed. The viewer has a standard task bar at the upper side of the screen, and tabs at the lower side of the screen to switch from one functional part of the IEED package to another.

BRIEF DESCRIPTION OF THE FIGURES

Non-limiting and non-exhaustive preferred embodiments of the present invention are described with references to the following figures wherein like reference numerals refer to like parts throughout the various views unless otherwise specified.

DETAILED DESCRIPTION OF THE INVENTION

Figure 1:
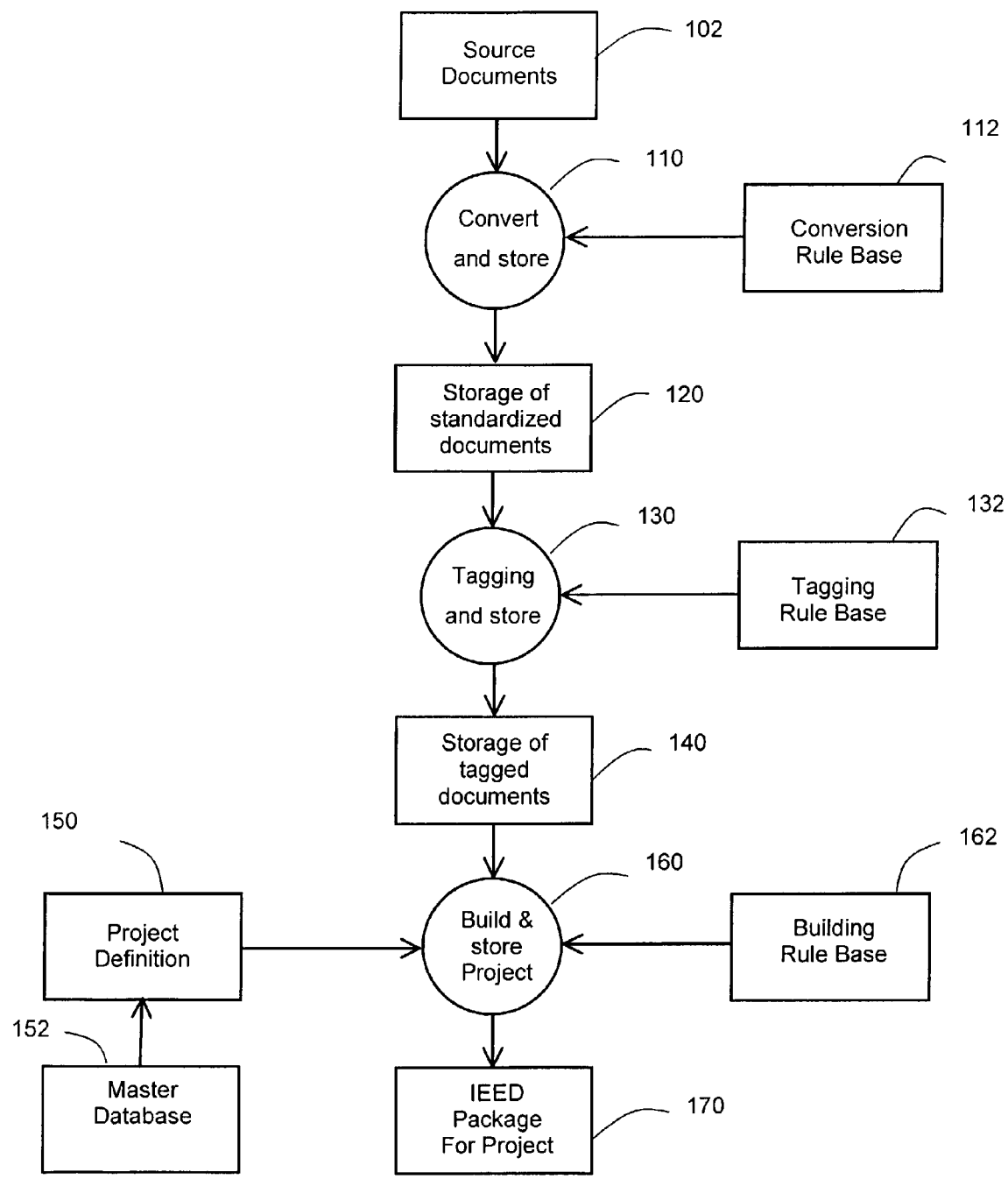
FIG. 1 is a flowchart illustrating the process of forming an IEED package for a project.

In industries, such as the semiconductor industry, capital equipment is used in the manufacturing process. This equipment is rather complex and costly. In order to ensure proper use and maintenance, each system is provided with an extensive set of documentation. Examples of information include customer information (customer name, address, contacts, etc.), equipment information (system type, serial number, etc.), equipment status information (maintenance info., etc), Bill of Materials (all assemblies and sub-assemblies), AutoCAD drawings, spare part information, pictures, manuals created by both the manufacturer and OEM supplier, and hardware and software release notes.

Since it is convenient for both the manufacturer and the consumer to have this information in electronic form, a computer accessible documentation system is needed. Despite the fact that standardization is high within one family of equipment, each tool in the family of equipment has individual characteristics. These individual characteristics are due to the specific process to be run on the equipment or tool, or due to customer requirements regarding a certain brand of components to be build-in into the equipment during manufacturing. Consequently, the information and documentation associated with each individual tool, while partly general and common to each tool, are, to a great extent, tool specific.

IEED packages, each with different content, are necessary for different purposes. For example, packages with information concerning maintenance and service support are required at different levels: for the customer (equipment on-site), for the field service engineer (equipment to be serviced), for the field service office (all equipment in a certain geographical area), and for the factory that manufactures the equipment (includes all equipment).

Each deliverable documentation to a user is known as a project, which is in fact a specific selection of documentation regarding individual tools, which are included in the IEED package. A project should be completely self contained without links to other projects.

To access the files relating to a project, two options are provided. First, the project files can be available on a central server and accessed via data connection lines or via Internet to remote computers or terminals. Alternatively, it is possible to store all the files relating to a project on a removable storage medium such as a CD-ROM or DVD-ROM. In this way, the files can be accessed locally on a computer.

Below a step by step description of the formation of an IEED package for a project is given with reference to the appended figures. In one embodiment, the formation of an IEED package can be done on a single computer, such as a standard computer having and Intel or AMD processor and running an operating system such as Windows, Mac, OS, Linux and the like. Typically such a computer will be provided with a storage device for storing input files, intermediate files produced during the processing steps and final files produced to produce the final packages. The computer would also include standard components such as a monitor, keyboard and the like. In discussion of the formation of the IEED package the documents are provided to, processed by and results stored by such a computer. The functions of converting a document, tagging a document, and building a package are typically performed by software instructions running on the processor of the computer. However, these functions, while typically performed by a single processor can for convenience also be said to be performed by a conversion processor, a tagging processor and a building processor. Instead of a single computer, the tasks of converting, tagging and building as well as the components of the computer system can be distributed amongst multiple computer systems including those connected by local area networks, wide area networks, the Internet or any other method of distributive computing. The actual computer system used is unimportant; it is the novel method of formation of an IEED package that is important. The viewer program, to be described below, can similarly be implanted on a computer.

Conversion/Standardization Phase

First, with reference to FIG. 1, source documents 102, needed to create the IEED package are provided. These source documents can be generated over a long period of time and can be supplied by various parties. A problem that often occurs is that similar information, coming from different sources, has different file formats. Also, a file's format may change over time as the producer of the file changes or upgrades software. Although in theory this can be solved, in practice, it appears a difficult problem to handle in an efficient way. According to the invention, as a first step after providing the source documents, the source documents 102 are converted into documents with a limited number of standard file formats as indicated in step 110. The standardization of documents is done once by computer and the documents in standardized format are stored in storage for standardized documents 120 for further use. The storage can be any computer storage means including magnetic storage and optical storage. The conversion process is controlled using a conversion rule base 112. Conversion rule base is a simple translation key that translates a known file format into a predefined, standardized file format. A processing program, using conversion rule base 112 converts the source documents 102 into the standardized file format. An advantage of this conversion is that for the rest of the building process the files that were from different sources and using different formats can be treated in the same way. Another advantage is that if the file format of a source document changes in the course of time, only the conversion program has to be changed. Therefore changes to the documents have no effect on the rest of the building process, after the conversion phase. Further, when new source documents using a non-standard file format need to be included into the IEED Package, they can easily be integrated into the system by building a specific conversion program with a new conversion rule base for this new source. Other components of the system such as the tagging system and the building system as well as the existing part of the database of standardized and tagged documents remain unchanged.

Tagging Phase

In a next step, step 130, the standardized documents are provided with tags using a tagging program running on a computer in conjunction with a tagging rule base 132. The tagging rule base 132 is for a large part based on the use of source files with a standardized file format as produced previously in the conversion phase. A standardized format and structure means that it is known where certain information can be found in the document or that certain information can be recognized from the format of the information. For example, a part number can be recognized either from the location of the part number in the document (such as in a Bill of Materials) or from the format of the part number itself (such as a string of a certain number of alpha-numerical characters in a manual) or from the combination of both. The tagging system and the build system recognizes the part number from its location within a document or format within a document and can mark the part number for further processing. Also, the structure of a document may facilitate the placement of tags. For example, a subheading in a table of contents could be a hyperlink to a subheading in the document. Whether it is a hyperlink to a subheading depends on the tagging rule base 132. The tagging rule base 132 defines which tags need to be formed. These tags comprise information about where a hot-spot or click-button needs to be formed, and comprises parameters defining the destination of a link to be created in the building phase. Depending on the type of standardized document, the tags are either stored in the document itself or in an associated file. According to the invention, the creation of tags is preferably carried out automatically, using a predefined tagging rule base in combination with a known file format of the source documents.

In one embodiment, three different categories of standardized tags are utilized. A tag can contain one or more parameters with each parameter defining the actions to be taken in the building phase. The first category of tags is predefined tags. Predefined tags are tags wherein a link that must be formed is uniquely defined. Examples are a jump link or a query link. The second category of tags is tags that are subject to verification. The link destination for such a tag subject to verification is defined, but during the building phase it will be decided if the link will be created or not. This category of tags is used in cases where the link destination might be missing. The third category of tags is tags that contain variables as parameters. These parameters are evaluated and the variables are filled in during the building phase. For the third category of tags, in the building phase it is not only verified if a link should be formed or not, but also the exact link destination of the link to be formed is defined, based on the parameters provided in the tag.

As is further explained in the following figures, tags of a certain category can be converted in the building phase into more defined tags of a lower category prior to the actual formation of the links. Some examples of tagging of documents include:

(1) In manuals, tags of the first category can be formed based on chapter headings, catchword, or other information. For example, tags in the document can be made on the text "see Figure" or "see Chapter", so that in a later stage the links to the proper figures and chapters can be automatically made.

(2) The structure of a piece of equipment is described in the Bill of Materials (BOM). A BOM starts with an information block, describing the top-level assembly of the equipment and the composing subassemblies. For each sub assembly a similar structure is available. This is repeated until no further assemblies exist, resulting in a hierarchical structure of the equipment. At the time of the file tagging it is not known which parts in the BOM should be considered as spares. Therefore all parts will be tagged with a spares tag, which is a category two tag. During build time it is checked if the part is indeed a spare. If it is, a link to the spare parts list is created. If not, the no link is made and the tag is discarded.

(3) New documentation is created and added over time. The linking of documentation to parts in the BOM is therefore an action that cannot be fully determined at tagging time. Therefore, parts in the BOM are provided with documentation tags in category three, with the part number as parameter. During build time the builder rule base determines which links have to be created, based on the parameter value.

(4) Different parts on a CAD drawing are labeled by so-called "find numbers" which are a circle containing a number. The tagging program will create category three tags for these "find numbers", each tag having a find number, its location on the drawing, and a drawing identification as parameters. The tags are stored in a separate file, associated with the CAD drawing file. This is advantageous because the drawing file format stays the same with link information stored in an additional associated file. The drawing identification and the find numbers can also be found in the BOM. Based on the associated file, the builder can create links between the CAD drawing and the BOM.

After tagging, a tagged document is stored in the tagged document storage for further use. This storage forms the source of documents from which each project to be built. Each tagged document is only included once in this storage. The tagging phase, in which tags are created, is distinct from the building phase, in which the tags are used to create links.

Building Phase

Before the building process can start, a project definition 150 needs to be provided. The project definition 150 defines the scope of the project i.e. the specific selection of individual tools for which the IEED package should be made. This project definition 150 specifies at a first level which documents from the tagged document storage are required for the formation of the project. Further documents will be included, depending on the information in the tags. The project definition is created using a master database 152, which contains information regarding tools, equipment and customer information. The equipment information contains the serial number, configuration information and the customer identification for each tool. The customer information contains customer identification, such as the name of the customer and the customer's address. The customer information makes it possible to select all customers located in a certain city, country, or geographical region. In this way a project can very quickly be defined to include all equipment for the customers in a certain area. Although project definition will be primarily done through customer selection, other possibilities exist. It is possible to make an equipment selection based on equipment type, or based on all equipment still under warranty, or all tools comprising a subassembly with a certain part number and revision number. Obviously, for such a different selection criterion, the master database 152 contains the relevant information. The project definitions are stored in the master database 152 to facilitate recreation of projects in the future.

In step 160, a project is built using a building process in conjunction with a build rule base 162. Building a project, after providing a Project definition, starts with the selection of the required documents from the storage of tagged documents. The Project Definition specifies at a first level which documents from the tagged document storage are required for the formation of the project. Further documents will be included, depending on the information in the tags. The selection mechanism ensures that each document is only selected once, even if multiple references to the same document are present. For example when a part is present "n" number of times, the corresponding CAD drawing for this part is only included once. Or when the project comprises multiple identical tools, the applicable manuals for that tool are included only once. Different revisions of an object are considered to be non-identical, and therefore for each revision present, the applicable documents are included in the project. An exception to the rule of avoiding duplicate information is the bill of material (BOM) information; it is allowed to have duplicating information about sub assemblies stored in BOM's for different tools.

The builder rule base controls the activities of the builder and describes the activities to be carried out. In the first phase of the building process after the selection of the required documents, all category three tags are converted into category two tags. The parameters in the category three tags are interpreted and combined with information from documents such as the BOM. The result is that all tag parameters are replaced by known values. This means that the tags are converted to tag type two.

In the next phase of the building process, for each category two tag, it is checked if a successful link can be created. If so, the tag is converted to a category one tag. If not, the tag is removed as being not applicable.

When the final stage of the building process starts, the documentation contains only category one tags. The builder continues with the final stage of the building process. In this final stage, all the tags are converted into links and final output files are created which contain all the highlighted word links, "hot-spots" or click-buttons, and the linking information. In the formation of the link, information stored in the tag will be used. In the majority of the cases, the part number plays an important role. By using the part number as a parameter in the tags, the link formation process can be automated. Other parameters can be used for the same purpose.

The format of the output files may be hypertext markup language (HTML), extended markup language (XML) or any other hyperlink language. Output files may also be in one or more proprietary formats that can be viewed on a viewer program. At the end of the building phase, files can be compressed so that they can be stored more conveniently. Files may also be encrypted to restrict access to the information to authorized users. As a last step in the building process, the IEED Package 170 is formed by storing all of the output files needed on a storage medium. The files can be distributed on CD-ROM, DVD-ROM or other media.

For several reasons, it can be necessary to update the project over time. This could be due to enhanced user documentation, expansion of the installed base, or modification of the installed equipment. To update to a new project, the necessary new or modified input files need to be provided, and subjected to the conversion and tagging steps so that the corresponding standardized and tagged files can be added to the library of standardized and tagged files. Then the build process is executed again. Finally, the user needs to be given access to the updated files, e.g. by storing the files on CD-ROM and making the CD-ROM available to the user.

Figure 2:
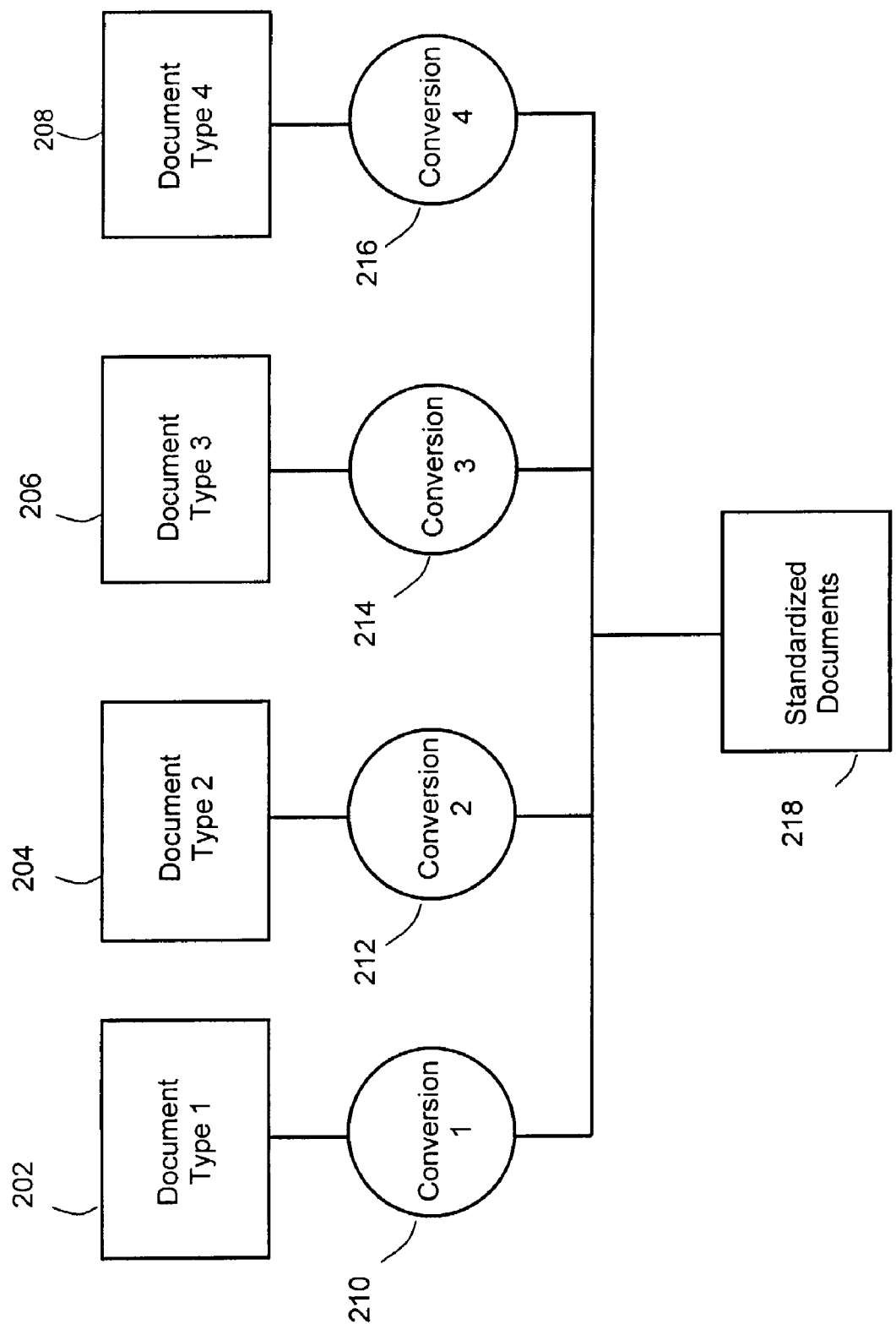
FIG. 2 is a block diagram showing different types of documents that are standardized.

The standardization of documents will be further described with the aid of FIG. 2. FIG. 2 is a block diagram illustrating different types of documents that are standardized. Illustrated are different document types 202-208. Document types may include a bill of material, AutoCAD drawings, spare parts list, and various manuals developed by either the manufacturer or by an OEM supplier any stored in one of any number of formats. Any other documents or document types may be used also. Each document type 202-208 has an associated conversion program 210-216. Each one of the conversion programs 210-216 is designated to convert its associated document type to one of a number of standardized documents 218. Although the conversion programs are indicated in FIG. 2 as multiple dedicated modules, it is possible to combine part or all of the modules into one conversion program. Also, in cases where a company has multiple subsidiaries at different geographical locations that each produce a variety of documents, specific conversion programs can be used for each subsidiary, if needed. The respective subsidiaries can also be interconnected in any feasible way such as via a local area network or wide area network.

Figure 3:
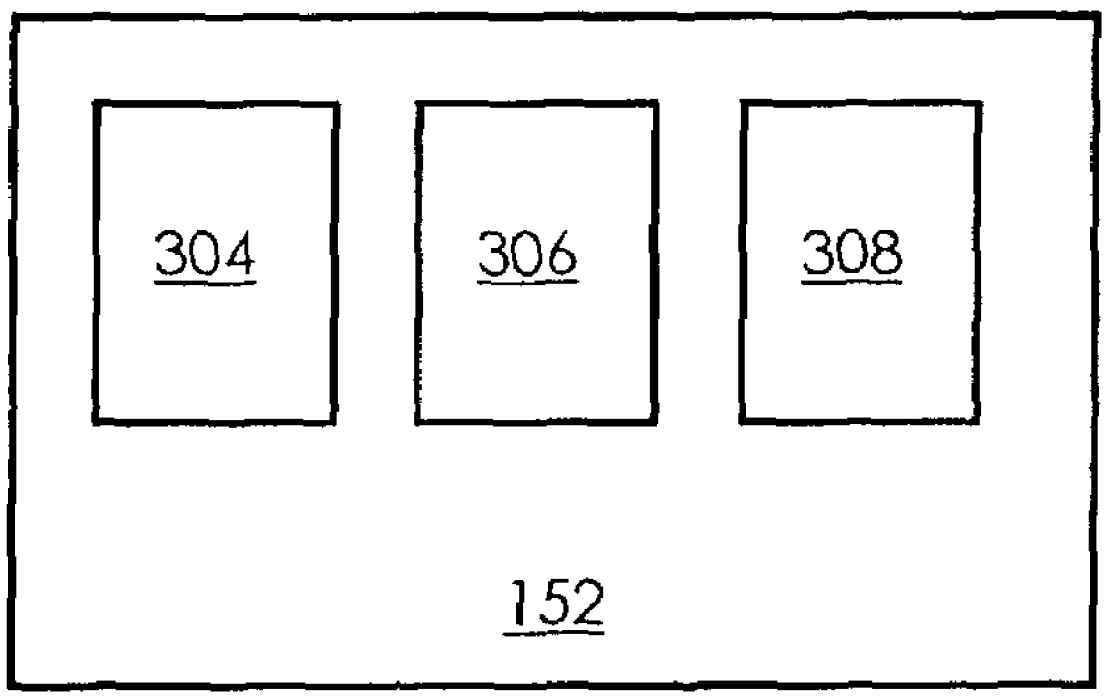
FIG. 3 is a block diagram of the structure of the master database.

FIG. 3 is a block diagram of the master database 152. FIG. 3 shows a master database 152, which includes an equipment database 304, a customer database 306, and a project database 308. Equipment database 304 contains configuration information for each piece of equipment. This includes for each piece of equipment: the machine type, the top level BOM part number, and the customer location to which it has been or will be supplied. Customer database 306 comprises additional information concerning customer locations, addresses, contacts and the like. The customer database 306 makes it possible to select all the customers located in a certain city, country, or geographical region. Finally, the project database 308 comprises a number of project names and connects each project name with one or more customer names. In this way, a project can be very quickly defined for all the customers in a certain country or region. In one embodiment, the project definition is done primarily through customer selection. However, project definition can also be done in a different way, such as being based on equipment type, or being based on all tools delivered in a certain time period, provided that the information used to perform the selection is present in the master database.

Figure 4:
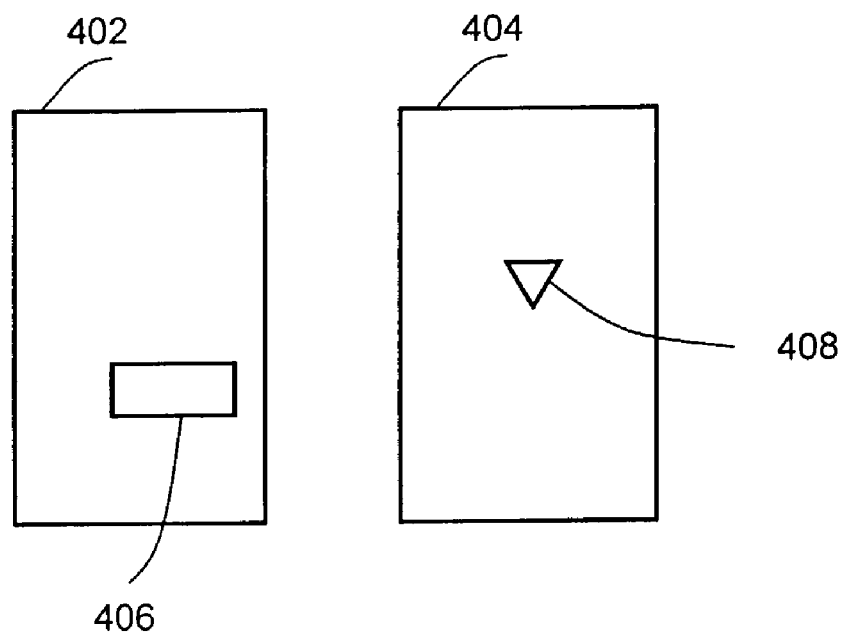
FIG. 4 is a block diagram showing documents to be provided with a jump link.
Figure 5:
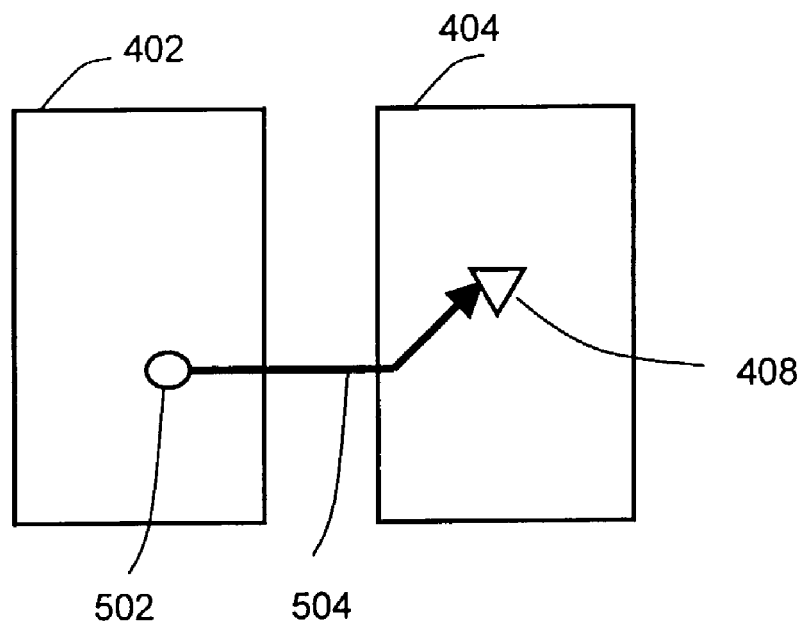
FIG. 5 is a block diagram showing two documents provided with a jump link and a click-button.

FIGS. 4 and 5 are block diagrams illustrating the creation of a jump link. FIG. 4 shows two documents 402 and 404 that relate to a project. Document 402 contains a tag 406 and document 404 contains a marker 408. The marker 408 defines a location in the document 404 to which a jump link is made. The marker 408 needs to be provided in the source document. When the tag 406 is included in the document 402, the location of the tag 406 is the location of the hot-spot or click-button to be formed. When the tag 406 is not included in the source document itself but in an associated file, the tag 406 in the associated file contains information about the location and size of the hot-spot or click-button to be formed in the source document. Further, the tag 406 contains the following information: link type (such as jump), and link destination. The information relating to the link destination can include the document to which a link should be created, and parameters that depend on the link type. In case of a jump link, the tag comprises the jump destination within the document as a parameter. The builder checks if the requested document and destination are available. If this is the case, as seen in FIG. 5, a click-button 502 is formed in document 402, according to information contained in tag 402, and a hyperlink 504 is formed from document 402 to the marker 408 in document 404. Click button 502 is typically formed by highlighting the word or phrase associated with the jump link. Also a button or other icon can be provided. The marker 408 can be in a document different from the document wherein the tag is, as shown in FIG. 4 and FIG. 5, or the tag 406 can refer to a marker 408 within the same document as the click-button. Working with markers is possible within the scope of the present invention, in particular when jumps are made within one document. However, the full advantages and flexibility of the present invention become apparent when using query links as described below.

Figure 6:
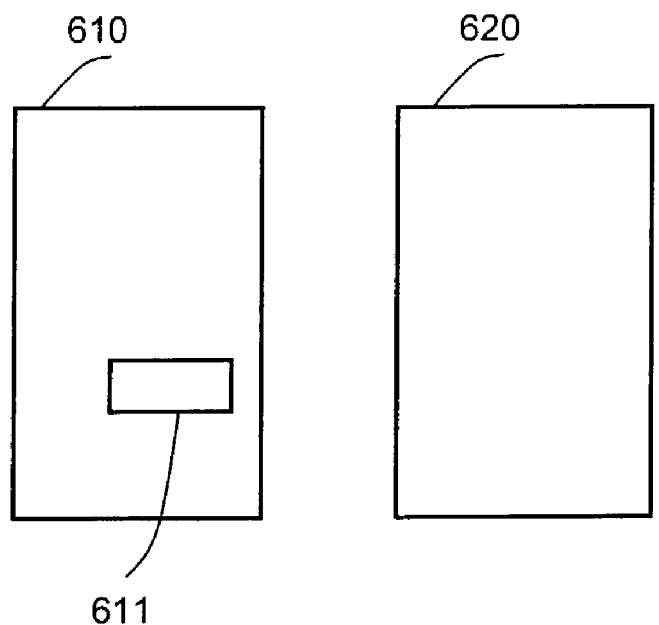
FIG. 6 is a block diagram showing two documents to be provided with a query link.
Figure 7:
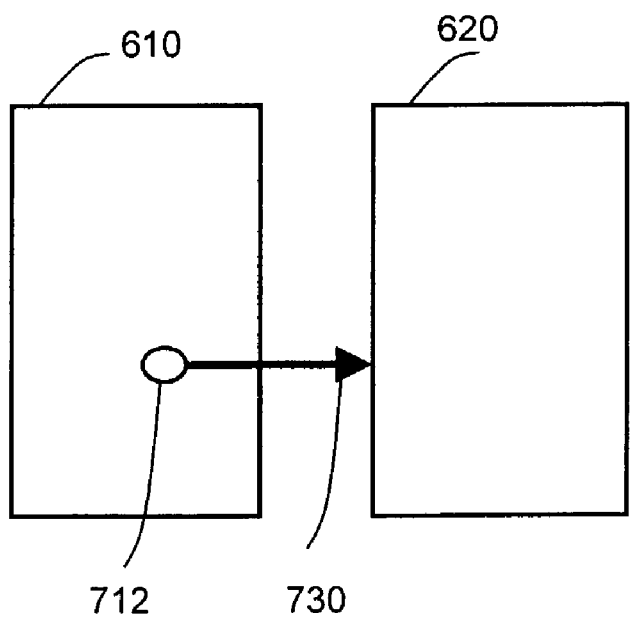
FIG. 7 is a block diagram showing two documents provided with a query link and click-button.

FIGS. 6 and 7 illustrate the formation of a query link. Again, two documents 610 and 620 are provided as part of the project. The tag 611 in document 610 contains information regarding link type (such as query) and document to which a link should be created. In this case, the tag 611 further comprises one or more parameters, which are translated into a query syntax during the building phase. The parameters can comprise a certain word or a part number to be searched for in the body of the document. Further the query, to be executed on the linked document, can comprise a combination of search terms or other conditions. By execution of the query, all sections of the linked document that fulfill the criteria of the query will be highlighted. In the building phase, the builder checks if the requested document 620 is available. If this is the case, a click-button 712 is formed in document 610, according to information contained in tag 611, and a hyperlink 730 is formed from document 610 to document 620, as seen in FIG. 7. In the preferred embodiment, the query will be executed every time that the user activates the click-button 612.

Figure 8:
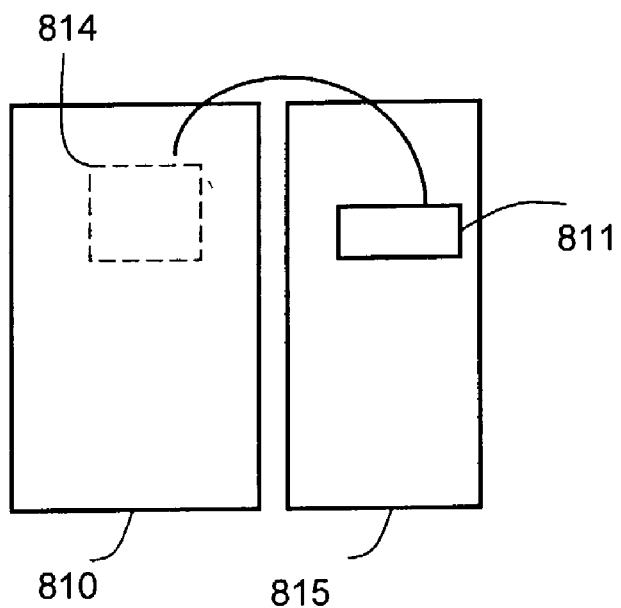
FIG. 8 is a block diagram showing the use of an associated file with AutoCAD drawings.
Figure 9:
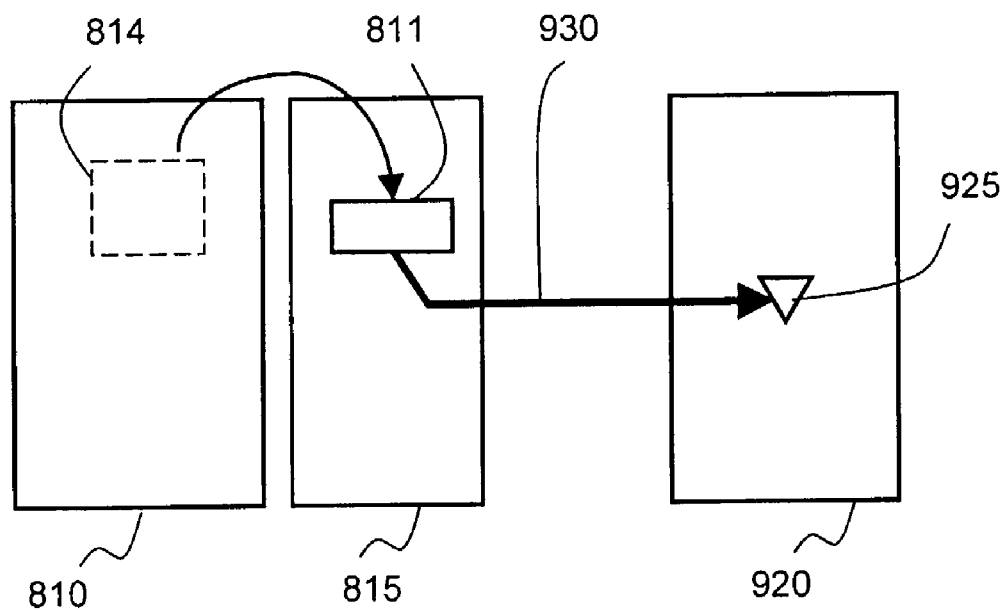
FIG. 9 is a block diagram showing an AutoCAD file and a document provided with click-button and a hyperlink.

FIGS. 8 and 9 describe the use of an associated file to store click-button and tag information for documents like AutoCAD drawings where the file format has to be retained. For AutoCAD files and other drawings or illustration files, the original file format has to be maintained. Consequently, it is not possible to store click button information and tags directly in the file. Therefore an associated file 815 is used, which is associated to the original file 810. In the associated file 815, information 811 is stored defining an area 814 in the picture to serve as the click button. Further, the information 811 comprises information regarding the action to be taken when the click button is pressed. The project further includes destination document 920, which contains a marker 925 marking the destination of a link as seen in FIG. 9. Document 910 is linked to the marker 925 in destination document 920. Using the information contained in tag 811, the builder checks if the requested document and destination are available. If this is the case, the tag 811 is converted into the hyperlink 930, linking associated file 815 to document 820.

During the viewing process, the viewer program will track mouse or other pointing device movements (including the touching of a touch screen). If the mouse or other device is selected or clicked when the pointer is within the area 814 (as determined by the information in the associated file 815), the viewer program reads the associated file 815, and executes the found hyperlink instruction. For example, document 810 can be an AutoCAD drawing of a subassembly showing a plurality of parts wherein each part is provided with a so-called drawing position number or "find number". A find number is a circle containing a number. Consequently, the associated file 815 comprises a list of the find numbers used and for each find number an area 814 corresponding with the circle in the AutoCAD drawing. Further, the associated file 815 comprises for each find number information specifying a link to be made like a link to another document 820 such as a bill of materials, or a close up of the art. Selecting the circle of the find number in document 810 corresponding to a part causes the viewing program to read the associated file 815 to determine what action to take, such as viewing the Bill of Materials or a more detailed AutoCAD drawing of the selected part.

Figure 10:
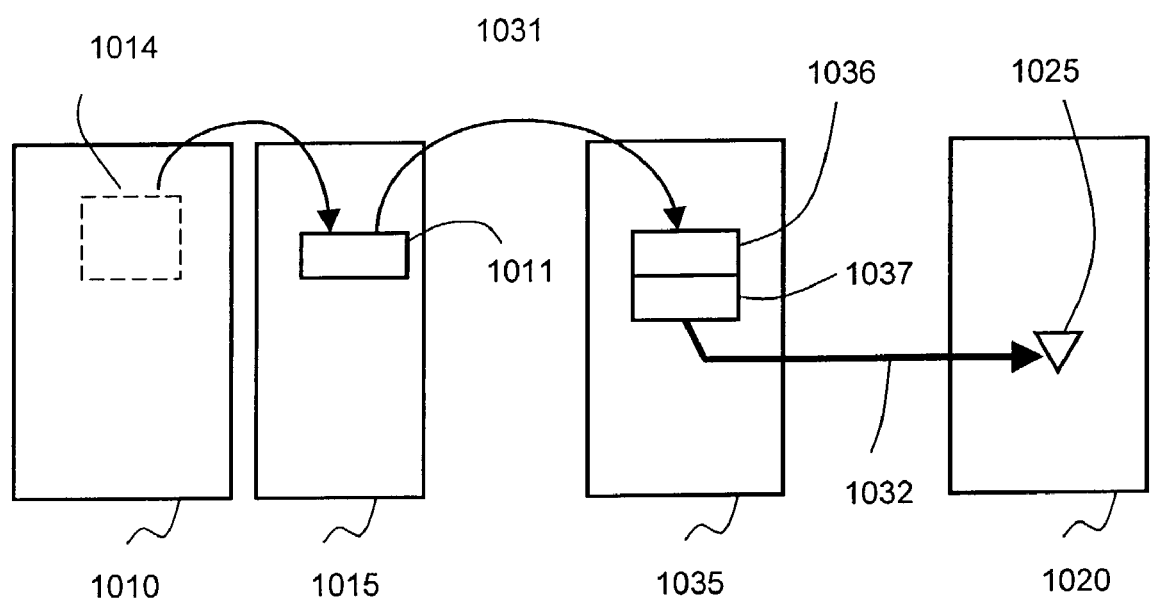
FIG. 10 is a block diagram showing a generic picture file and a document provided with a click-button and a hyperlink.

FIG. 10 shows the use of hyperlinks on generic picture files where the original picture format needs to be retained. If the original picture file format has to be retained, it is not possible to store click button information and tags directly in the file. Therefore, an associated file 1015 is used, which is associated to the original picture file 1010. In the associated file information 1011 is stored defining an area 1014 in the picture that will serve as the click button. To minimize the amount of creation and maintenance work for the IEED package, it is advantageous if a generic picture file 1010 and the associated file 1015 can be reused for different tools in different projects. Therefore, the information 1011 includes a generic tag with a generic parameter. For example, the generic tag may be "reactor" which can refer to a number of different reactors, such as atmospheric reactors and vacuum reactors. In the building phase, link file 1035 is created which specifies the machine specific actions for the generic tags. So, if the specific machine is an atmospheric reactor, link file 1035 will refer to that type of reactor. Link file 1035 contains label 1036, which refers to the generic tag 1011 in associated file 1015 and a tag 1037. The project further includes document 1020, which contains marker 1025. The builder program checks, based on the information contained in tag 1037, if the requested document and destination are available. If this is the case, the tag 1037 is converted into the hyperlink 1032, linking file 1035 to document 1020. When the area 1014 is clicked, the viewer program will read the associated file 1015 and the link file 1035 and execute the found hyperlink instruction. This way of dealing with pictures creates a very flexible system, which requires very little manual work. An advantage of this technique is also that for a project only a limited number of pictures are required, therefore reducing the needed memory space considerably. Obviously, a picture can comprise a plurality of click buttons and links.

Figure 11:
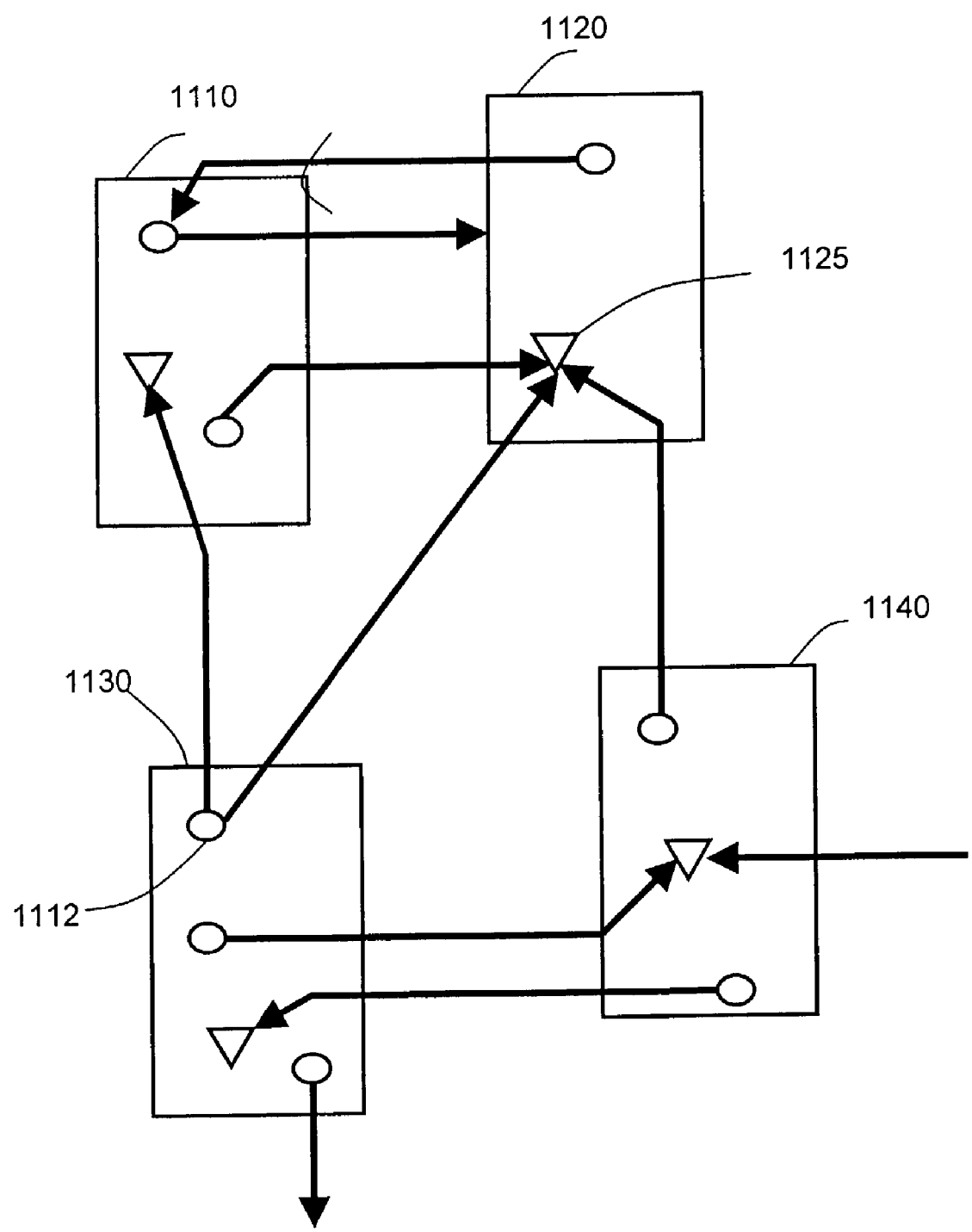
FIG. 11 is a block diagram showing four documents provided with links.

FIG. 11 shows an example of a number of linked documents. For simplicity reasons, no files with an associated file or a link file are included. Four documents, 1110, 1120, 1130 and 1140 are shown. With 1112, a click button with two possible link destinations is indicated. In such a case, after clicking the button, a pop-up screen appears, offering a selection between the available link destinations. With 1125, a link destination is indicated that can be reached from various departure points.

According to the present invention, the process of project formation is fully automated, and therefore does not require a great effort. Great advantage of this procedure is that the documents relating to additions or modifications are fully integrated into the IEED package, complete with all the desired hyperlinks.

The completed IEED package can be viewed by a user using viewing software. In one embodiment the viewing software is built around a number of commercially available ActiveX software components. Those components allow the viewing of different file formats. The viewing program is designed to run on a computer, stand alone or networked, that includes a processor and memory such as an IBM compatible computer with an Intel processor and running the Windows operating system. Further, this computer includes a user interface such as a monitor and a keyboard or a touch screen to display and to navigate through the information relating to a Project. In FIGS. 12-16 exemplary windows from an exemplary viewing program are illustrated.

Figure 12:
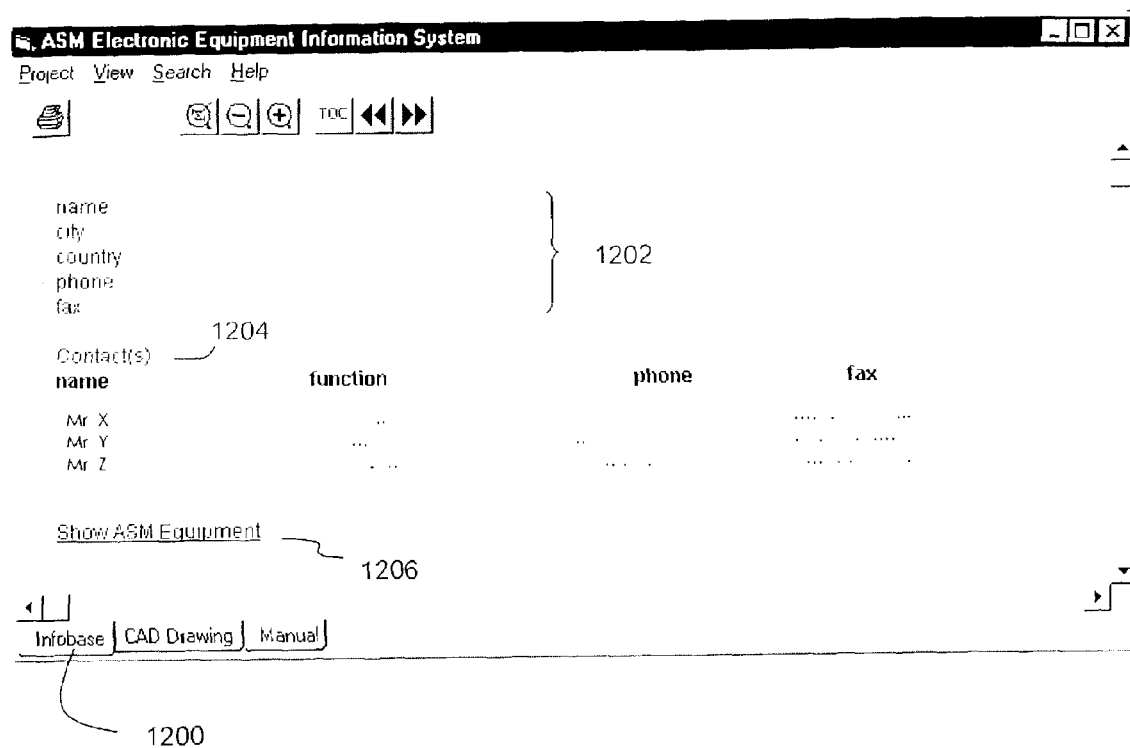
FIG. 12 is an exemplary customer information screen.

FIG. 12 is an exemplary customer information screen 1200. Customer information screen 1200 displays customer related information such as name, address and contact information. Customer information screen 1200 includes company information section 1202, contact section 1204 and a hypertext link 1206 labeled "show equipment". Selecting link 1206 brings up an equipment summary window.

Figure 13:
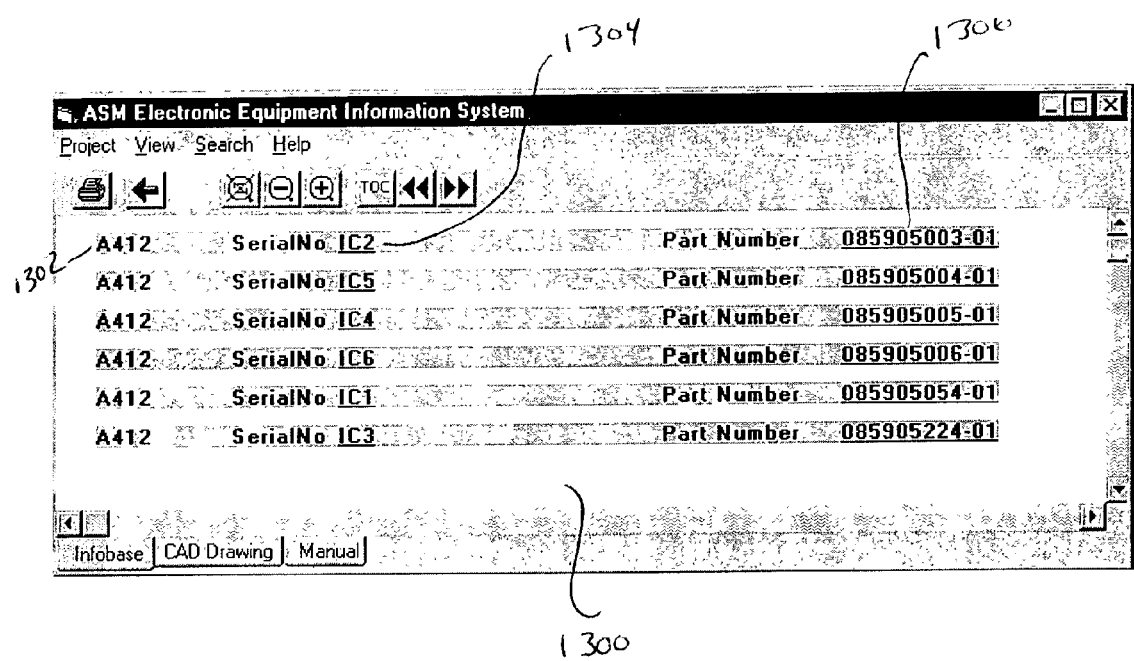
FIG. 13 illustrates an exemplary equipment summary window.
Figure 15:
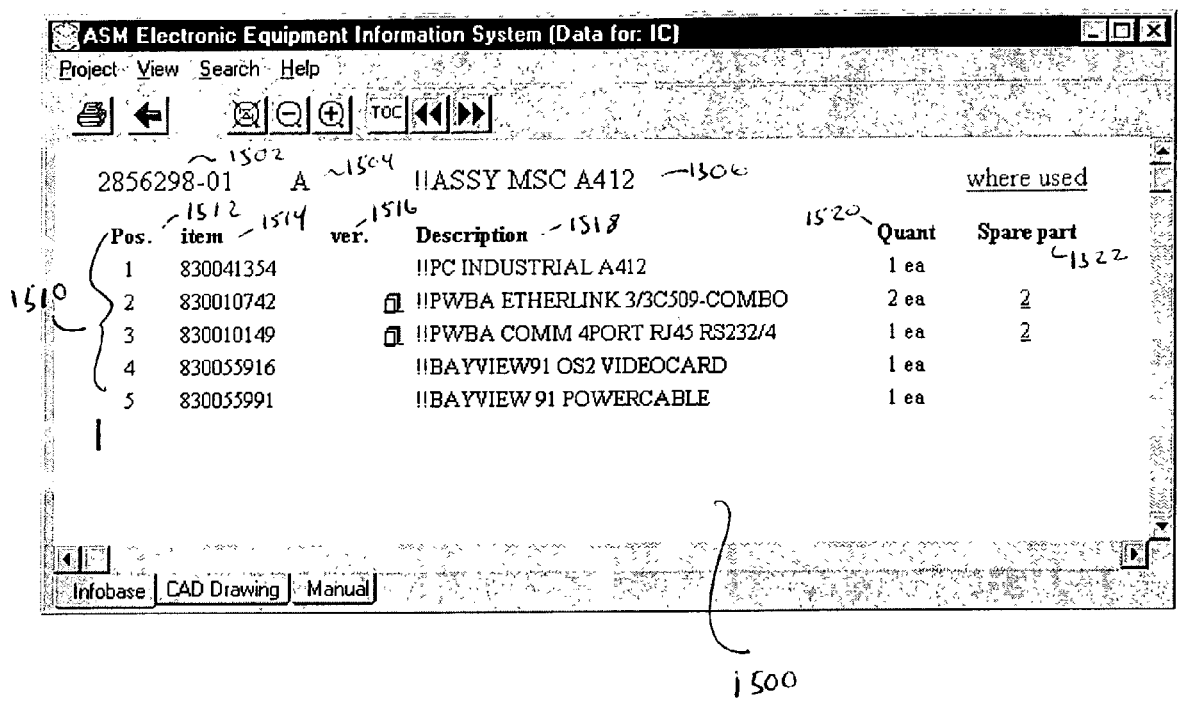
FIG. 15 illustrates an exemplary bill of material window.

FIG. 13 illustrates an exemplary equipment summary window 1300. Equipment summary window 1300 lists all the equipment provided to this particular customer by the manufacturer. This can be all the equipment provided to a customer or all the equipment at a specific site or location. Equipment summary window 1300 shows a list of the equipment listed by equipment name 1302, serial number 1304 and part number 1306. Selecting the part number 1306 will open the bill of material window as seen in FIG. 15. Selecting the serial number 1304 will open the index window.

Figure 14:
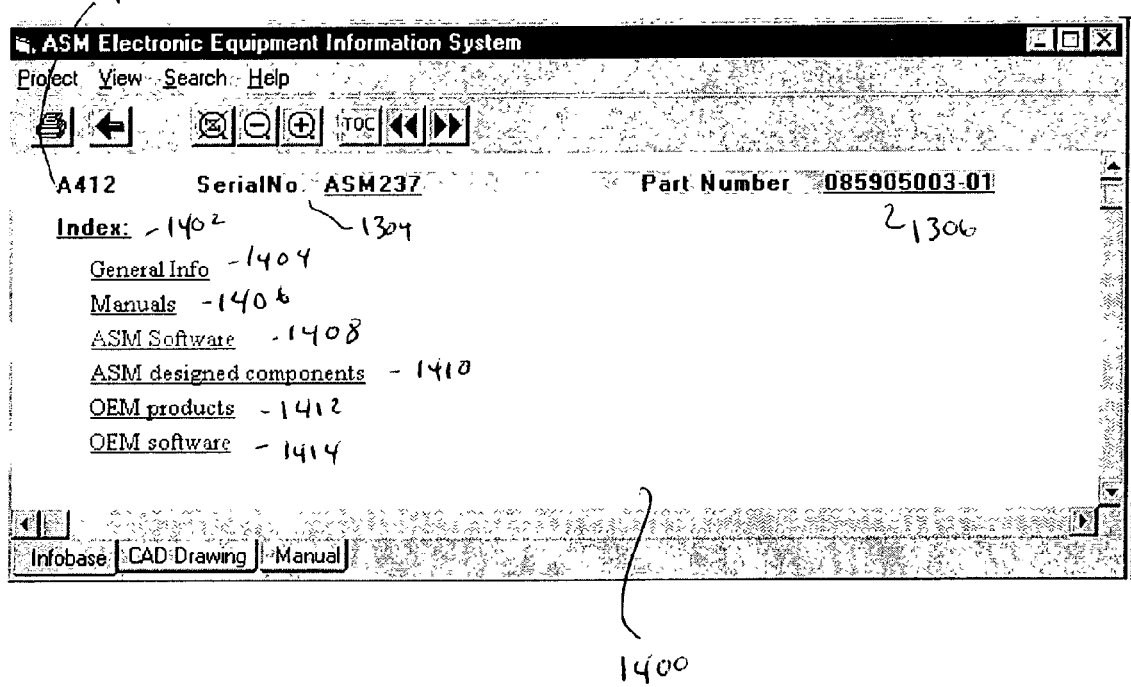
FIG. 14 illustrates an exemplary index window.

FIG. 14 illustrates an exemplary index window 1400. Index window 1400 displays a listing of information for the particular equipment selected from equipment summary window 1300. Shown are the equipment name 1302, the serial number 1304 and the part number 1306. Also shown are an index 1402 that includes a number of hyperlinks including a general information link 1404, a manual link 1406, a manufacturer's designed component link 1410, an OEM product link 1412 and an OEM software link 1414.

Selecting general information link 1404 will open a general information window that lists the administrative details for the equipment. Selecting the manual link 1406 will open a manual window that includes links to all system manuals for the equipment. Selecting manufacturer's software link 1408 will open software window. Software window lists the name of all software, the version number, the release date and installation data. This includes any controller associated with the software. Each software listing can be associated with hyperlinks that link to associated reference notes. Selecting manufacturer's designed component link 1410 opens the manufacturer's designed component window. This window lists the major sections and modules of a piece of equipment designed by the manufacturer as well as listing the manufacturer of the components. Selecting the OEM product link 1412 opens the OEM product window. This window lists all OEM components and their manufacturer. Selecting the OEM software link opens the OEM software window. This window lists all OEM software along with any pertinent information.

FIG. 15 illustrates an exemplary bill of material window 1500. Bill of material window 1500 includes a listing of all assemblies and subassemblies in a piece of equipment. These are listed in a header line. Listed is a header line 1502 including the part number 1504, a revision number 1506 and a description 1508. The part number 1504 may be hyperlinked to the assembly drawing.

Below the assembly line are a plurality of subassembly lines 1510. Each line including a drawing position number 1512, a part number of the subassembly 1514, a revision number of the subassembly 1516, a description of the subassembly 1518, the quantity needed 1520 and the spare part link 1522.

Selecting the drawing position will open a window displaying the part of the assembly with that drawing number. Selecting the part number of the subassembly goes one level deeper in the BOM to list the components of the subassembly. Selecting the spare part link 1522 opens a spare parts window listing the spare part information database.

Figure 16:
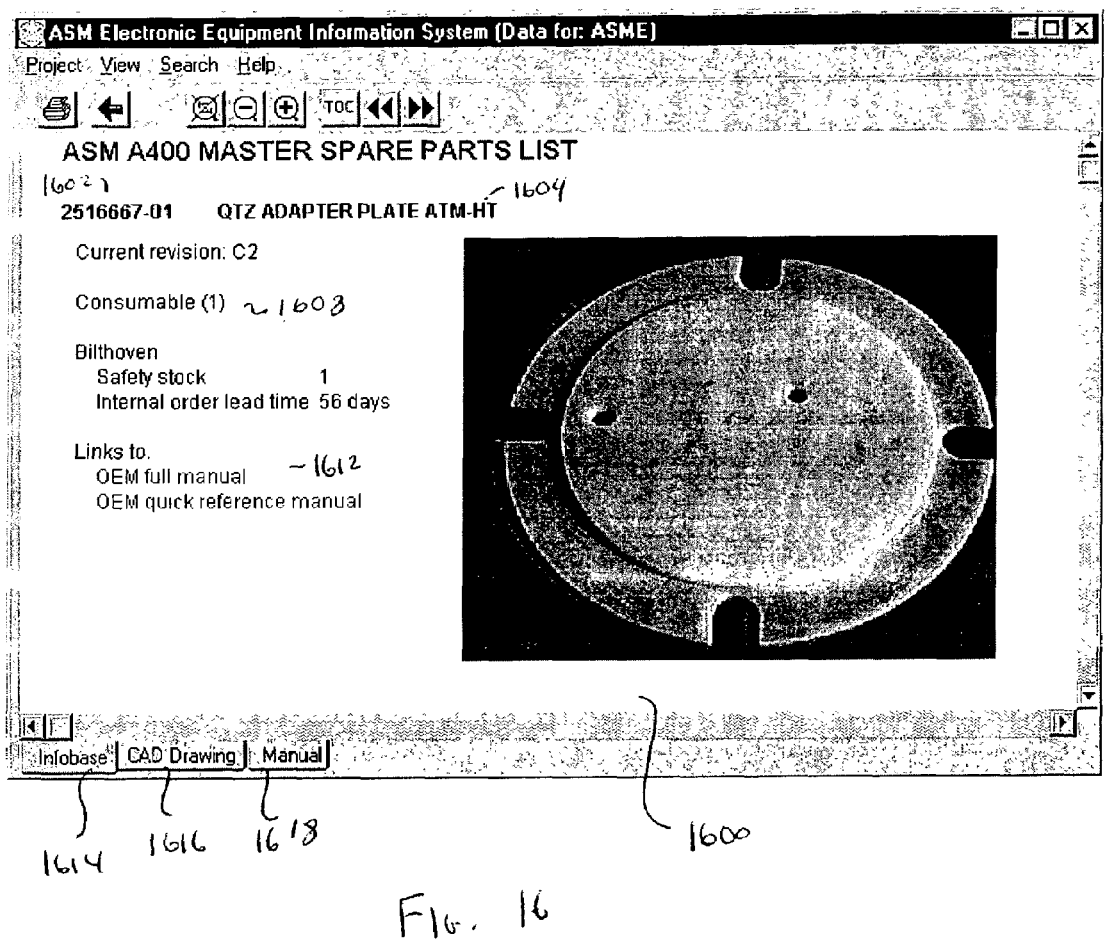
FIG. 16 is an exemplary spare part window.

FIG. 16 is an exemplary spare part window 1600. Illustrated is a parts number 1602, a parts description 1604, the current revision of the part 1606 and if the part is a spare part or a consumable part 1608. Also include is a drawing 1610 of the part. Additional, manual links 1612 can provide a selectable access to the full manual, the part of the manual relating to the part or a quick reference manual depending upon the needs of the customer and how the tags are formed.

Note in FIG. 16 the tabs 1614-1618. These tabs are listed as the infobase tab 1614, the CAD drawing tab 1616 and the manual tab 1618. The same tabs appear on the other exemplary screens. These tabs allow a user to switch between the project interface, the drawings and the manuals with a tab selection.

Having now described preferred embodiments of the invention, modifications and variations may occur to those skilled in the art. The invention is thus not limited to the preferred embodiments, but is instead set forth in the following clauses and legal equivalents thereof.

What is claimed is:

1. A method to produce an interactive electronic equipment documentation package, the package comprising multiple documents with hyperlinks, the method comprising:
   receiving input documents;
   providing tags to the input documents, each of the tags including tag information defining a request for the formation of a link and the formation of a click-button relating to the link;
   storing the tagged documents in a storage medium;
   providing a project definition;
   selecting, based on the project definition, a first set of tagged documents from the tagged documents in the storage medium;
   selecting a second set of tagged documents from the tagged documents in the storage medium, wherein the selecting of the second set of tagged documents is based on the tag information for one or more tags in the first set of tagged documents; and
   creating links and click-buttons for the selected tagged documents based on the tag information associated with each tag.

2. The method of claim 1 wherein the step of creating links and click-buttons for the input documents based on the tag information comprises providing a building rule base and creating the links and click-buttons based on instructions in the building rule base and the tag information.

3. The method of claim 1 wherein the step of providing tags to the input documents comprises providing a tagging rule base and creating the tags automatically, based on the instructions in the tagging rule base.

4. The method of claim 1 wherein the tags comprise high level tags that contain parameters defining a link to be formed which require interpretation during a build phase and low level tags that contain parameters that uniquely define a link to be formed.

5. The method of claim 4 wherein the high level tags include a link destination that is dependent on the interpretation during the build phase.

6. The method of claim 4 wherein for the high level tags the decision to form a link is dependent on the interpretation.

7. The method of claim 3 wherein in the step of creating the tags automatically based on the instructions in the tagging rule base, further comprises using, the format of selected pieces of information in the input documents to create the tags.

8. The method of claim 1 wherein the step of receiving input documents comprises the step of receiving input documents with a known file format.

9. The method of claim 8, wherein the step of creating the tags automatically further comprises using the known file format to create the tags.

10. The method of claim 8 wherein the step of receiving input documents with the known file format is followed by converting the input documents with the known file format into documents with a predefined, standardized file format.

11. The method of claim 1 wherein the project is viewed using a viewer program, the viewer program comprising a single user interface through which the interactive electronic document package, including files with different file formats, can be viewed and wherein the user interface window comprises at least one of a menu bar with pull-down menus and an icon bar with icons.

12. The method of claim 11 wherein the information in the interactive electronic equipment documentation package is divided into two or more categories, and the user interface of the viewer program includes selection fields to select a category of information of a project and to switch from one category to another.

13. The method of claim 1 wherein the step of creating links comprises creating links to a drawing file or a picture file by using an associated file to store link information.

14. The method of claim 1 further comprising providing a generic picture with a generic associated file, the generic associated file comprising a generic tag, and further providing the generic picture and its generic associated file with a link file, the link file linking the generic picture to a specific file.

15. A method for producing an electronic documentation package comprising:
receiving a plurality of source documents;
tagging the plurality of source documents with tags comprising information defining requests for forming the locations of click-buttons and hyperlinks to produce a plurality of tagged documents; and
processing the plurality of tagged documents to determine whether documents and destinations defined in one or more of the requests for forming are available and, when available, forming the requested hyperlinks and click-buttons to produce a plurality of final documents that include the requested click-buttons and hyperlinks.

16. The method of claim 15 further comprising viewing the final documents using a viewer program.

17. The method of claim 16 wherein the viewer program is capable of viewing different file formats and wherein the viewer program comprises a single user interface through which the different file formats can be viewed.

18. The method of claim 16 where in the viewer program includes tabs or selection buttons selectable to showing different parts of the project.

19. The method of claim 15 wherein the step of receiving a plurality of source documents comprises receiving a plurality of documents with a known file format.

20. The method of claim 19, further comprises converting the plurality of documents with the known file format into a plurality of documents with a predefined file format using a standardization rule base.

21. The method of claim 15 wherein the step of tagging the plurality of source documents further comprises providing an associated file to store tag information associated with a drawing.

22. The method of claim 15 wherein the step of tagging further comprises using a tagging rule base to determine the tags.

23. The method of claim 15 wherein the step of tagging further comprises providing different levels of tags comprising high level tags that contain parameters, defining a link to be formed, which require interpretation during a building phase wherein the links are created based on tag information and low level tags that comprise parameters which uniquely define a link to be formed.

24. The method claim 15 where in the step of processing the tags further comprises using a build rule base to process the tags.

25. An apparatus for producing an electronic documentation package comprising:
a tagging processor operable to provide tags to one or more input documents with one or more known file formats to produce a collection of tagged documents, each of the tags including tag information defining a request for the formation of a link and the formation of a click-button relating to the link; and
a building processor operable to produce the electronic documentation package by: (i) selecting specific tagged documents from the collection of tagged documents based on a project definition, (ii) selecting additional tagged documents based on the tag information of the previously selected tagged documents to meet the requests, and (iii) forming between one or more of the selected documents one or more of the links and one or more of the click-buttons.

26. The apparatus of claim 25 further comprising a conversion processor operable to convert the one or more input documents into one or more standardized input documents with one or more predefined standardized file formats.

27. The apparatus of claim 25 wherein the tagging processor further comprises a tagging rule base for automatically determining the location of the tags.

28. The apparatus of claim 27 wherein the tagging rule base defines high level tags and low level tags, the high level tags defining one or more links require further evaluation and low level tags defining parameters that uniquely define one or more links to be formed.

29. The apparatus of claim 25 wherein the location of tags is determined by the format of information in the one or more input documents.

30. The apparatus of claim 25 wherein at least one of the one or more input documents is a graphic file and the tag processor is operable to produce an associated file containing an association between a drawing position number in the graphic file and information defining a link.

31. The apparatus of claim 25 wherein the building processor comprises a building rule base operable to evaluate high level tags and produce the one or more links and click-buttons for high level tags and low-level tags.

32. The apparatus of claim 26 wherein the conversion processor, the tagging processor, and the building processor are provided as a single processor.

33. The apparatus of claim 26 wherein the electronic documentation package is viewable through a viewer program.

34. An electronic documentation package assembler comprising:
   conversion means for converting one or more input documents into one or more standardized input documents with one or more predefined standardized file formats;
   tagging means for providing tags to the one or more standardized documents to produce a collection of standardized tag documents, each of the tags including tag information defining a request for the formation of a link and the formation of a click-button relating to the link; and
   building means for producing the electronic documentation package by: (i) selecting specific standardized documents from the collection of standardized tag documents based on a project definition, (ii) selecting additional standardized tagged documents based on the tag information of the previously selected standardized tagged documents to meet the requests, and (iii) forming between one or more of the selected documents one or more of the links and one or more of the click-buttons.

35. The assembler of claim 34 wherein the tagging means further comprises a tagging rule base for automatically determining the location of tags in the standardized documents.

36. The assembler of claim 35 wherein the tagging rule base defines high level tags and low level tags, the high level tags defining one or more links that require further evaluation and low level tags defining parameters that uniquely define a link to be formed.

37. The assembler of claim 34 wherein the location of the tags is determined by the format of information in the standardized documents.

38. The assembler of claim 34 wherein at least one of the one or more input documents is a graphic file and the tagging means is operable to produce an associated file containing information defining a click-button area and a corresponding link relating to a part number displayed in the graphic file.

39. The apparatus of claim 34 wherein the building means comprises a building rule base operable to evaluate high level tags and produce the one or more links and click-buttons for high level tags and low-level tags.

40. The apparatus of claim 34 wherein the electronic documentation package is viewable through a viewer program.

* * * * *